3,322,769
THIO PERINONE DYESTUFFS
Otto Fuchs, Heinrich Sieber, and Helmut Troster, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 10, 1964, Ser. No. 381,904
Claims priority, application Germany, July 11, 1963, F 40,212; Feb. 29, 1964, F 42,162
11 Claims. (Cl. 260—282)

The present invention relates to new dyestuffs and a process for preparing them; more particularly, it relates to dyestuffs consisting of a mixture of isomeric compounds of the general formulae

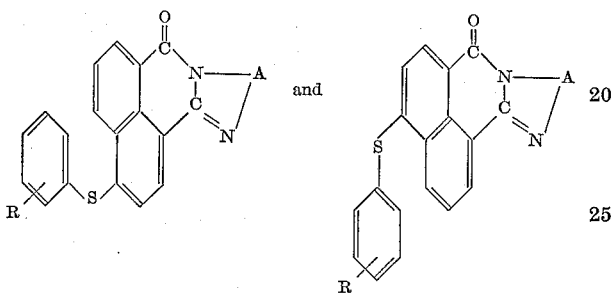

wherein A represents an unsubstituted or a substituted phenylene or naphthylene radical and R represents a hydrogen or a halogen atom or an alkyl, aryl, alkoxy, cyano, hydroxy, hydroxymethyl, carbalkoxy, acyloxy or amino group.

It has now been found that dyestuffs consisting of a mixture of isomeric compounds of the general formulae

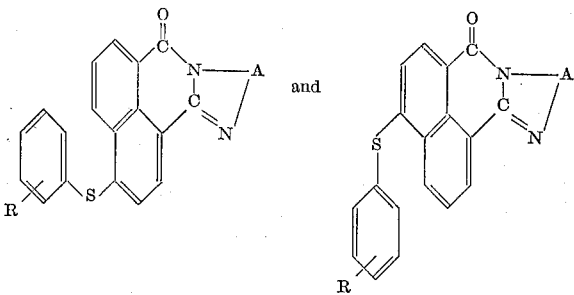

wherein A represents an unsubstituted or a substituted phenylene or naphthylene radical and R represents a hydrogen or a halogen atom or an alkyl, aryl, alkoxy, cyano, hydroxy, hydroxymethyl, carbalkoxy, acyloxy or amino group, can be obtained.

(a) By condensing 4′,5′-dichloro- or 4′,5′-dibromo-1′,8′-naphthoylene-arylimidazoles or their substitution products with substituted or unsubstituted thiophenols in an organic solvent, if desired in the presence of an acid-binding agent, and heating the compounds obtained of the general formula

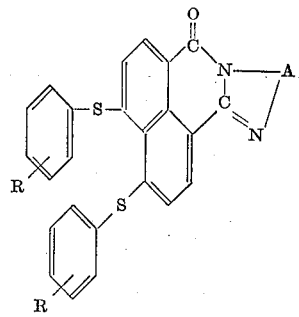

in which R and A have the meanings indicated above, with excess thiophenols in the presence of catalytic quantities of alkali metal in acid dialkyl-amides, or (b) By condensing a mixture of isomeric compounds of the general formulae

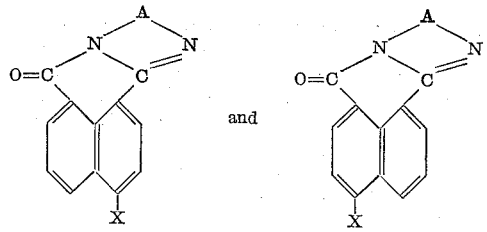

wherein A represents a substituted or an unsubstituted phenylene or naphthylene radical and X represents a chlorine or a bromine atom, with substituted or unsubstituted thiophenols in an organic solvent, if desired in the presence of an acid-binding agent.

The preparation of the dyestuffs according to method (a) is advantageously effected by heating the 4′,5′-dichloro- or 4′,5′-dibromo-1′,8′-naphthoylene-arylimidazoles or their substitution products with the stoichiometric amount of a substituted or unsubstituted thiophenol in an organic solvent, as for example an alcohol, glycolmonoalkyl ether, a pyridine base or an acid alkylamide, for a short period, for instance for 30 minutes. The reaction is advantageously carried out in the presence of the stoichiometric amount of an acid-binding agent necessary for binding the separated acid, such as for example an alkali metal hydroxide, carbonate or acetate. If the condensation is carried out in an organic solvent which has itself an acid-binding reaction, like pyridine or dimethylformamide, it is unnecessary to add another acid-binding agent. The condensation can be effected within a wide temperature range, the optimal temperature to be applied being determined in each individual case for the starting compounds and the solvent used. It is, however, expedient to effect the condensation at a temperature in the range from 120° to 160° C. While cooling the reaction mixture the dithio ether formed separates in sufficiently pure state for the reaction to follow.

In order to convert the dithio ether into the mixture of the 4′- and 5′-phenylmercaptonaphthoylene-arylimidazoles of the formula mentioned above it is heated for some hours with at least 2 mols of a thiophenol corresponding to that used for the first stage or differing from it, in an acid dialkylamide such as dimethyl-formamide, dimethylacetamide, N-methyl-pyrrolidone or phosphoric acid tris-dimethylamide and in the presence of catalytic amounts of an alkali metal such as an alkali metal hydroxide, carbonate or acetate. The sepration of one of the phenyl-mercapto radicals may be effected within a wide temperature range, the optimal temperature to be applied being determined in each individual case for the starting compounds and the acid dialkyl-amide used. However, the reaction is advantageously carried out at a temperature in the range from 120° to 160° C., preferably from about 140° to 150° C. The dyestuff mixture formed according to the process of the present invention may be isolated directly after cooling or after dilution with a solvent having a low boiling point and precipitating the dyestuff mixture, as for example methanol.

The dyestuff mixture may be prepared also in a direct way without isolation of the dithio ether mentioned above by heating the 4',5'-dichloro- or 4',5'-dibromo-1',8'-naphthoylene-arylimidazoles or their susbtitution products with at least 4 mols of an unsubstituted or a substituted thiophenol for some hours at a temperature in the range from about 130° to 160° C., in one of the acid dialkyl-amides mentioned above and in the presence of an amount of alkali metal slightly exceeding that required for binding 2 mols of hydrogen chloride or hydrogen bromide, such as for example an alkali metal hydroxide or carbonate.

The 4',5'-dichloro- and 4',5'-dibromo-1',8'-naphthoylene-arylimidazoles used as starting compounds for method a) can be prepared in known manner by reacting 4,5-dichloro- or 4,5-dibromonaphthalic acids or their anhydrides with unsubstituted or substituted aromatic o-diamines.

The preparation of the dyestuffs according to method (b) is advantageously effected by heating an isomeric mixture consisting of 4'- and 5'-chloro- or 4'- and 5'-bromo-1',8'-naphthoylene-arylimidazoles or their substitution products with the stoichiometric amount of a substituted or unsubstituted thiophenol in an organic solvent, such as an alcohol, glycol-monoalkyl ether, a pyridine base or an acid alkylamide. The reaction is advantageously carried out in the presence of the stoichiometric amount of an acid-binding agent necessary for binding the acid which has been split off, as for example an alkali metal hydroxide, carbonate or acetate. If the condensation is effected in an organic solvent which has itself an acid-binding reaction, like pyridine or dimethyl-foramide, it is unnecessary to add another acid-binding agent. The condensation is advantageously effected at a temperature in the range from about 60° to 160° C. The dyestuff mixture formed according to the process of the present invention can be isolated in the manner described above.

The isomeric mixtures of 4'- and 5'-chloro- or 4'- and 5'-bromo-1',8'-naphthoylene-arylimidazoles used as starting compounds in this method of operation can be prepared in known manner by reacting 4-chloro- or 4-bromonaphthalic acid or the anhydrides thereof with unsubstituted or substituted aromatic o-diamines.

The isomeric mixtures obtained according to the process of the present invention are new, valuable dyestuffs ranging from yellow to orange which are particularly suitable for dyeing synthetic materials, such as for example polyethyleneglycol-terephthalate. The dyeings obtained are distinguished by a highly brilliant tint and by very good fastness properties, especially by a very good fastness to light, wetting and heat-setting.

The following examples serve to illustrate the invention but they are not intended to limit it thereto the parts being by weight unless otherwise stated.

*Example 1*

(a) 67.8 parts of 4',5'-dichloro-1',8'-naphthoylene-benzimidazole are heated to the boil for 30 minutes with 44 parts of thiophenol and 28 parts of anyhdrous potassium carbonate in 680 parts of dimethylformamide. While cooling the reaction mixture the dithio ether crystallizes in the form of orange-red needles. It is filtered with suction, washed with methanol and hot water and dried.

*Analysis.*—Calculated: S, 13.2%. Found: 13.2%.

Instead of dimethyl-formamide there may also be used other organic solvents, for example butanol, amyl alcohol, ethylene-glycol-monoethyl ether, pyridine, N-methylacetamide, dimethyl-acetamide or phosphoric acid tris-dimethylamide. The potassium carbonate used may be substituted by other alkali metal salts, such as sodium carbonate, sodium acetate, sodium hydroxide or potassium hydroxide.

(b) 24.3 parts of the dithio ether prepared as described above and 12.1 parts of thiophenyl are kept at the boil for two hours in 250 parts of dimethylforamide while adding 1.0 part of anhydrous sodium acetate. After cooling the product which has crystallized in the form of small yellow needles is filtered off with suction, washed with methanol and water and dried. The dyestuff which is obtained in very pure state and an excellent yield produces brilliant greenish-yellow dyeings on polyester fibres having a very good fastness to light, wetting and heat-setting.

*Analysis.*—Calculated: C, 76.2%; H, 3.7%; N, 7.4%; S, 8.5%. Found: C, 76.4%; H, 3.8%; N, 7.4%; S, 8.5%.

Instead of sodium acetate there may also be used potassium or sodium carbonate or sodium hydroxide. Apart from dimethyl-formamide dimethyl-acetamide, N-methyl-pyrrolidone or phosphoric acid tris-dimethylamide are suitable solvents.

*Example 2*

A mixture of 34 parts of 4',5'-dichloro-1',8'-naphthoylenebenzimidazole, 48 parts of thiophenol, 10 parts of sodium hydroxide and 340 parts of dimethyl-formamide is stirred for 1½ hours at 140°–150° C. The reaction product is filtered with suction, washed with methanol and hot water and dried. The dyestuff obtained is identical with the product described in Example 1(b).

*Example 3*

8.6 parts of 4',5'-dibromo-1',8'-naphthoylenebenzimidazole are stirred for 1½ hours, at 140°–150° C., together with 2.5 parts of anhydrous sodium carbonate and 9.5 parts of thiophenol in 70 parts of phosphoric acid tris-dimethylamide. While cooling the reaction mixture the dyestuff which is identical with the product described in Example 1(b) precipitates in the form of a microcrystalline powder. It is worked up in the manner described in Example 1(b).

*Example 4*

50 parts of thiophenol are added to a mixture of 38.3 parts of 4',5'-dichloro-1',8'-naphthoylene-5-ethoxybenzimidazole, 15.2 parts of anhydrous potassium carbonate and 380 parts of dimethyl-formamide and the whole is kept boiling for 5 hours. After cooling the reaction mixture is diluted with 300 parts of methanol and left for a few hours. The precipitated orange-yellow dyestuff is filtered with suction and washed with methanol and dried.

With the use of this dyestuff brilliant orange-yellow dyeings having a very good fastness to light and heatsetting are obtained on polyester.

*Example 5*

25.2 parts of the dithio ether prepared according to Example 1(a) from 4',-5'-dichloro-1',8'-naphthoylene-5-methylbenzimidazole and p-thiocresol, 13.6 parts of p-thiocresol and 0.4 parts of anhydrous potassium carbonate are boiled under reflux for 3 hours in 250 parts of dimethylformamide. While cooling the dyestuff crystallizes in the form of small yellow needles. It dyes polyesters brilliant yellow shades.

*Example 6*

36.4 parts of 4',5'-dichloro-1',-8'-naphthoylene-5-cyanobenzimidazole are stirred for 1 hour at boiling temperature with 25 parts of thiophenol and 16 parts of anhydrous potassium carbonate in 350 parts of dimethylformamide. Then another 27.5 parts of thiophenol are added and the whole is kept boiling for another 4 hours. While cooling the dyestuff precipitates in the form of a yellow powder. In order to complete the precipitation the reaction mixture is mixed with 300 parts of methanol and the dyestuff is worked up in the usual manner.

When applied to polyesters, the dyestuff obtained yields greenish-yellow dyeings corresponding in shade almost exactly to the dyeings obtained with the dyestuff described in Example 1.

Example 7

43.8 parts of the dithio ether prepared according to Example 1(a) from 4′,5′,-dichloro-1′,8′-napthoylenebenzimidazole by means of p-methoxy-thiophenol are stirred for 3 hours at boiling temperature, together with 0.5 part of potassium carbonate and 30 parts of p-methoxy-thiophenol in 400 parts of dimethylformamide. After the usual working up a yellow dyestuff is obtained which yields brilliant yellow dyeings having a very good fastness to light, wetting and heat-setting on polyesters.

The following table indicates a number of other dyestuffs which are obtained according to the method of operation described in the above examples.

| 4′,5′-dichloro-1′,8′-naphthoylenearylimidazole | Thiophenol | Tint |
| --- | --- | --- |
| 4′,5′-dichloro-1′,8′-naphthoylenebensimidazole. | 4-chlorothiophenol. | Yellow. |
| 4′,5′-dichloro-1′,8′-naphthoylene-4-chlorobenzimidazole. | Thiophenol. | Greenish-yellow. |
| 4′,5′-dichloro-1′,8′-naphthoylene-5-methoxybenzimidazole. | do. | Orange-yellow. |
| 4′,5′-dichloro-1′,8′-naphthoylene-5-chlorbenzimidazole. | 4-methylthiophenol. | Yellow. |
| 4′,5′-dichloro-1′,8′-napthoylene-5-chlorbenzimidazole. | 4-methoxy-thiophenol. | Do. |
| 4′,5′-dichloro-1′,8′-naphthoylene-5-methylbenzimidazole. | Thiophenol. | Do. |
| 4′,5′-dichloro-1′,8′-naphthoylene-5-chlorobenzimidazole. | do. | Do. |
| 4′,5′-dichloro-1′,8′-naphthoylene-benzimidazole. | 4-methylthiophenol. | Do. |

Example 8

10.4 parts of an isomeric mixture consisting of 4′- and 5′-bromo-1′,8′-naphthoylene-benzimidazole, 4.3 parts of thiophenol and 2.5 parts of anhydrous potassium carbonate are heated to the boil for 1 hour in 60 parts of dimethyl-formamide. After cooling the suspension is diluted with methanol, the reaction product is filtered with suction, washed with methanol and water and dried. The dystuff which is obtained in an almost quantitative yield is identical with the product obtained according to Example 1(b).

When applied to polyester fibers the dyestuff yields brilliant greenish-yellow dyeings having a very good fastness to light, wetting and heat-setting.

Instead of dimethyl-formamide other organic solvents, such as butanyl, amyl alcohol, ethylene-glycol-monomethyl ether, pyridine, N-methyl-acetamide, dimethylacetamide or phosphoric acid tris-dimethylamide may also be used. The potassium carbonate used may be substituted by other alkali metal salts, such as sodium carbonate, sodium acetate, sodium hydroxide or potassium hydroxide.

Example 9

A mixture of 29.5 parts of an isomeric mixture consisting of 4′- and 5′-bromo-1′,8′-naphthoylene-5-ethoxy-benzimidazole, 5.3 parts of anhydrous sodium carbonate, 9.9 parts of thiophenol and 390 parts of ethyl alcohol is heated under reflux to the boil for 6 hours. Then the orange-colored reaction product which has precipitated is filtered with suction, washed with ethanol, then with hot water and dried. The dyestuff obtained yields brilliant orange-yellow dyeings having a very good fastness to light and heat-setting on polyesters and is identical with the product described in Example 4.

Example 10

8.5 parts of 4-methoxythiophenol are added to a solution of 17.0 parts of an isomeric mixture consisting of 4′- and 5′-chloro-1′,8′-naphthoylene-5-chlorobenzimidazole in 200 parts of dimethyl-formamide and the whole is heated to the boil for 3 hours. The orange-yellow dyestuff obtained is filtered with suction, washed with methanol and water and dried. When applied to polyester this dyestuff yields brilliant yellow dyeings having a very good fastness to light and heat-setting.

Example 11

19.7 parts of an isomeric mixture consisting of 4′- and 5′ - bromo - 1′,-8′ - naphthoylene - 5 - nitro - benzimidazole, are kept boiling for 2 hours together with 6.1 parts of thiophenol in 200 parts of pyridine. The dyestuff precipitating while cooling is filtered with suction, washed with methanol and water and dried. When applied to polyester fibers this dyestuff yields brilliant greenish-yellow dyeings having very good fastness properties.

Example 12

5.0 parts of thio-salicylic acid methylester are added to a mixture of 9.8 parts of an isomeric mixture consisting of 4′- and 5′-bromo-1′,8′-naphthoylene-5-ethoxybenzimidazole, 2.5 parts of anhydrous potassium carbonate and 100 parts of n-butanol and the whole is kept boiling for 4 hours. After working-up in the manner described in Example 8 an orange-red dyestuff powder is obtained which dyes polyesters orange-yellow shades.

Example 13

9.6 parts of an isomeric mixture of 4′- and 5′-bromo-1′,8′-naphthoylene-4-chlorobenzimidazole, 4.2 parts of 4-methoxythiophenol and 1.5 parts of sodium carbonate are heated in 100 parts of N-methyl-acetamide for 4 hours to 140°–150° C. After cooling to about 50° C. the reaction mixture is reacted with 100 parts of methanol, the precipitated dyestuff is then filtered off with suction at room temperature and worked up in the manner described in Example 8. When applied to polyesters this dyestuff yields brilliant yellow dyeings having a very good fastness to light and heat-setting.

Example 14

6.7 parts of thiophenol are added to a mixture of 90.2 parts of an isomeric mixture of 4′- and 5′-bromo-1′,8′-naphthoylene-5-chloro-benzimidazole, 4.5 parts of anhydrous potassium carbonate and 200 parts of ethyleneglycol-monomethyl ether and the whole is kept boiling for 3 hours. After the usual working-up a brilliant yellow dyestuff is obtained, which, when applied to polyester, yields brilliant greenish-yellow dyeings having very good fastness properties.

The following table indicates a number of other dyestuffs which are obtained by the method described in Examples 8–14.

| Isomeric mixture consisting of— | Thiophenol | Tint on polyester |
| --- | --- | --- |
| 4′- and 5′-chloro-1′,8′-naphthoylene-5-methylbenzimidazole. | 2-carbomethoxy-thiophenol. | Yellow. |
| 4′- and 5′-chloro-1′,8′-naphthoylene-5-carbomethoxybenzimidazole. | Thiophenol. | Greenish-yellow. |
| 4′- and 5′-chloro-1′,8′-naphthoylene-5-carbomethoxybenzimidazole. | 2-carbomethoxy-thiophenol. | Do. |
| 4′- and 5′-chloro-1′,8′-naphthoylene-5-methylbenzimidazole. | 4-methoxythiophenol. | Yellow. |
| 4′- and 5′-chloro-1′,8′-naphthoylene-5-äthoxybenzimidazole. | do. | Orange-yellow. |
| 4′- and 5′-chloro-1′,8′-naphthoylene-5-bromobenzimidazole. | Thiophenol. | Yellow. |
| 4′- and 5′-chloro-1′,8′-naphthoylene-benzimidazole. | 3,4-dimethoxy-thiophenol. | Do. |

The same dyestuffs are obtained when using, instead of the 4'- and 5'-chlorine derivatives mentioned in the table, the corresponding bromine derivatives.

We claim:

1. Dyestuffs consisting of a mixture of isomeric compounds of the general formulae

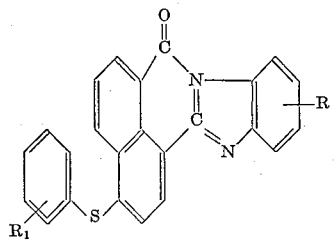

and

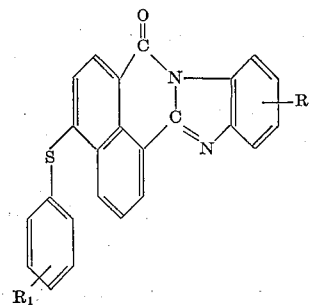

wherein R represents a member of the group consisting of a hydrogen atom, a chlorine atom, a lower alkoxy, a lower alkyl, a cyano, a nitro and a carboxy lower alkoxy group and $R_1$ represents a member selected from the group consisting of a hydrogen atom, a chlorine atom, a lower alkyl, a lower alkoxy and a carboxy lower alkoxy group.

2. Dyestuff consisting of a mixture of isomeric compounds of the formulae

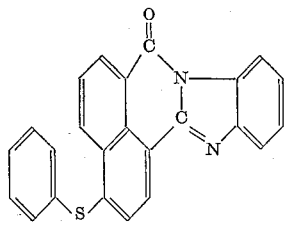

and

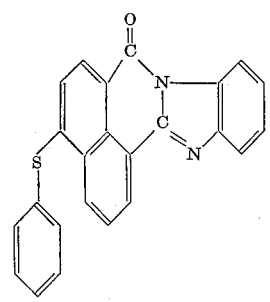

3. Dyestuff consisting of a mixture of isomeric compounds of the formulae

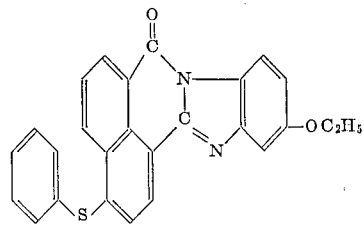

and

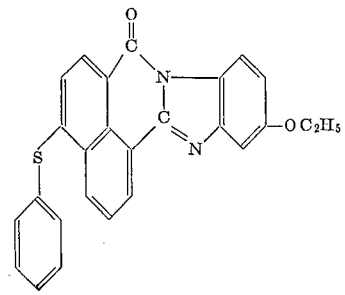

4. Dyestuff consisting of a mixture of isomeric compounds of the formulae

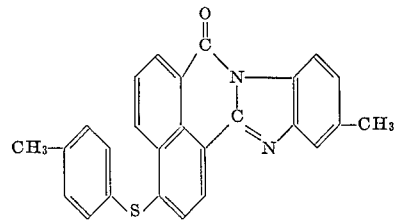

and

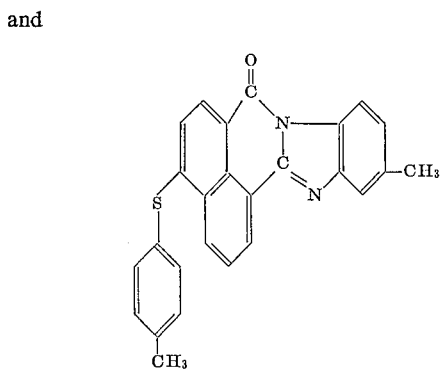

5. Dyestuff consisting of a mixture of isomeric compounds of the formulae

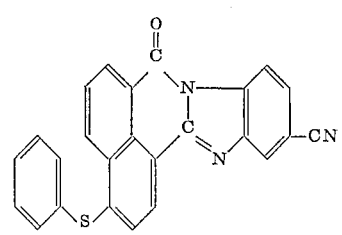

and

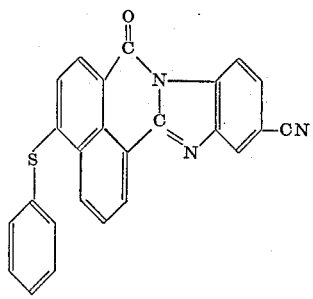

6. Dyestuff consisting of a mixture of isomeric compounds of the formulae

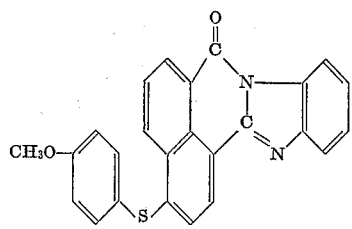

and

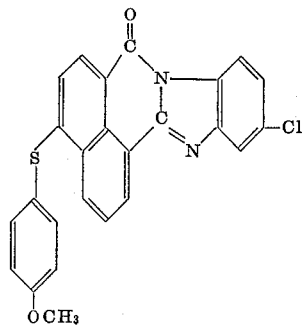

7. Dyestuff consisting of a mixture of isomeric compounds of the formulae

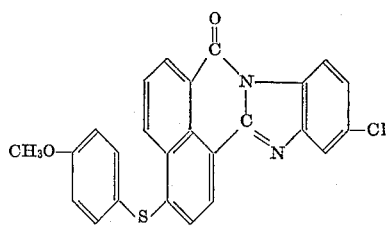

and

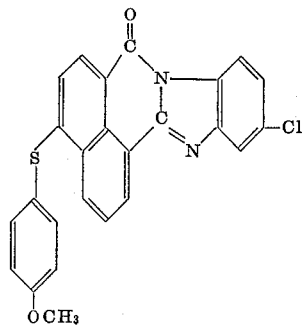

8. Dyestuff consisting of a mixture of isomeric compounds of the formulae

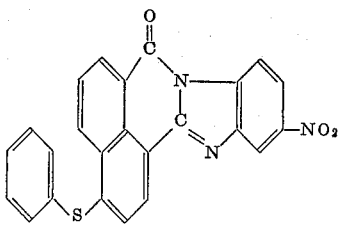

and

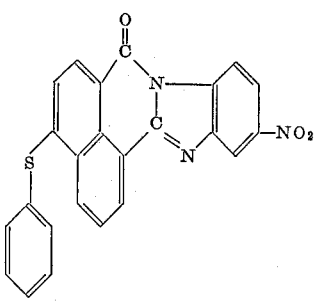

9. Dyestuff consisting of a mixture of isomeric compounds of the formulae

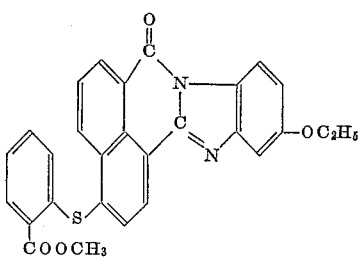

and

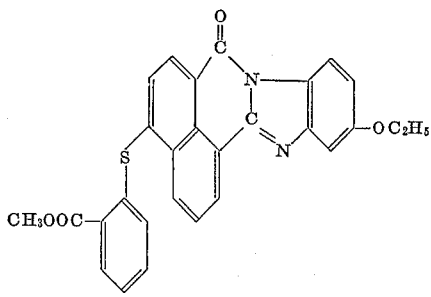

10. Dyestuff consisting of a mixture of isomeric compounds of the formulae

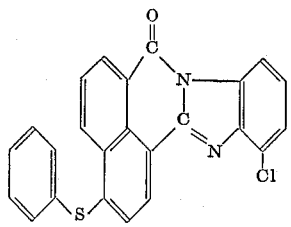

and 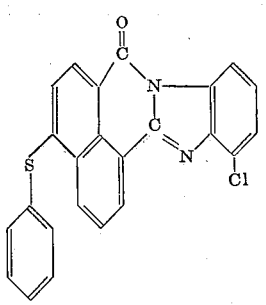 and 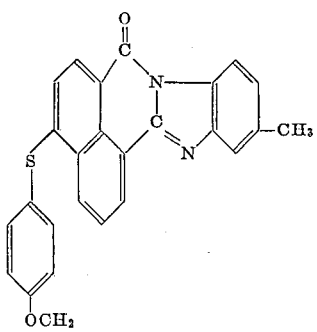
11. Dyestuff consisting of a mixture of isomeric compounds of the formulae
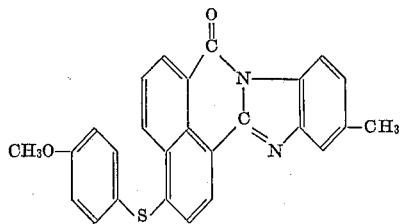
References Cited
UNITED STATES PATENTS
3,109,002  10/1963  Wilkinson _____ 260—279
ALEX MAZEL, *Primary Examiner.*
DONALD G. DAUS, *Assistant Examiner.*